Figure 1:
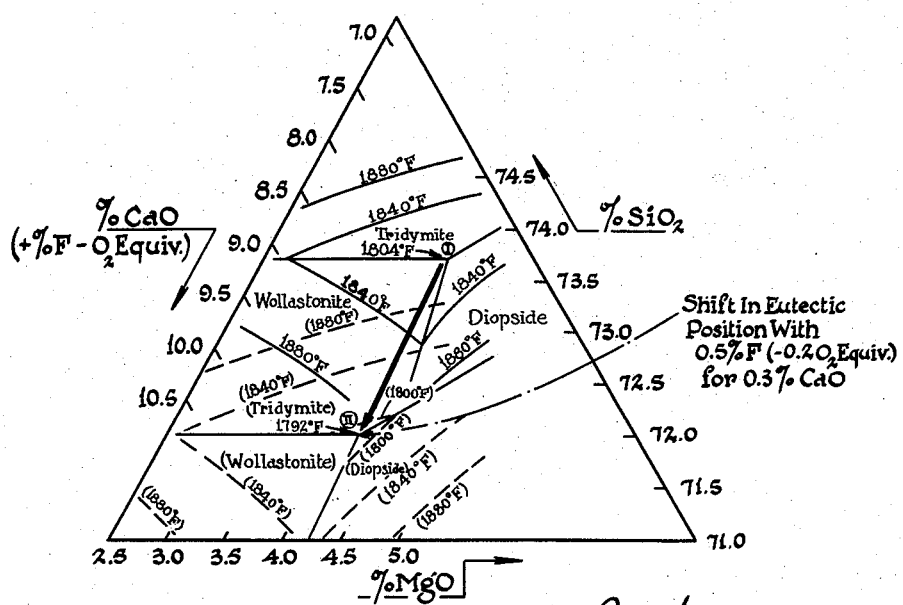

July 7, 1959  H. R. SWIFT ET AL  2,893,882
GLASS COMPOSITION
Filed Dec. 17, 1953

INVENTORS
Howard R. Swift and
BY Donald E. Sharp
Nobbe & Swope
ATTORNEYS

United States Patent Office 2,893,882
Patented July 7, 1959

2,893,882

GLASS COMPOSITION

Howard R. Swift, Toledo, and Donald E. Sharp, Maumee, Ohio, assignors to Libbey-Owens-Ford Glass Company, Toledo, Ohio, a corporation of Ohio Application December 17, 1953, Serial No. 398,711

8 Claims. (Cl. 106—52)

This invention relates to novel glasses and to batches from which they are made and more particularly to glasses having properties adaptable for continuous production in large quantities.

In the continuous tank production of glass and particularly in the manufacture of sheet glass, it has been found desirable that the glass composition have the following properties:

(a) A satisfactory chemical durability
(b) Good melting characteristics
(c) A suitable viscosity-temperature relationship
(d) A reasonable expansion coefficient, and
(e) A low liquidus temperature In considering the above properties, the necessity for a low liquidus temperature may not be readily apparent, but, it has been found in practice to be a very important consideration. Specifically, the lower liquidus temperature permits the operators to cool the glass to lower temperatures immediately before fabrication without encountering devitrification difficulties. This in turn makes the glass more viscous and allows the glass to be drawn at a greater speed for a given thickness of sheet glass.

Heretofore, to attain some of the above mentioned characteristics and in particular to attain a low liquidus temperature along with good melting characteristics, it has been customary practice to increase the soda content of the batch. Although the addition of the soda gives a lower liquidus temperature and better melting characteristics, it has been found to detract from the overall quality of the glass and to give poorer chemical durability and a high, unsatisfactory, coefficient of expansion.

In like manner, it has been found that the use of optimum quantities of aluminum oxide, calcium oxide, and magnesium oxide will give a satisfactory chemical durability, a reasonable coefficient of expansion and a suitable viscosity-temperature relationship. However, in using these optimum quantities of aluminum oxide, calcium oxide, and magnesium oxide, a high silica content must be used to obtain the optimum low liquidus temperature which high silica content in turn causes the melting characteristics to become unsatisfactory because of the formation of a melting scum. Thus, it will be noted that an increase in several desirable characteristics or properties is obtained only at a reduction in other desirable properties and the overall characteristics of the batch are not substantially improved.

It is therefore a primary object of this invention to produce glass compositions having good chemical durability and melting characteristics, a suitable viscosity-temperature relationship, a low liquidus temperature, and a reasonable coefficient of expansion.

A further object is to provide a glass of special composition having those characteristics set forth above which is adapted for continuous production in large quantities in accordance with conventional methods and apparatus used in the manufacture of sheet glass.

It is to be pointed out that the development of this invention came about by our desire to find what quantities of the beforementioned ingredients of aluminum oxide, calcium oxide, magnesium oxide, sodium oxide, and silica would give the optimum durability, expansion, and crystallization resistance properties without regard to the optimum meltability and viscosity characteristics. Having found these specific quantities, we then discovered that the above-named desirable resulting properties could be retained and at the same time the melting characteristics and the viscosity-temperature relationship could be substantially enhanced by lowering the silica content of the batch while at the same time adding, within certain narrow ranges, definite quantities of certain non-metals and their compounds, such as fluorine and phosphorous which have the property of causing glass to become substantially opalescent to visible light radiation when used in large quantities.

While it has been well known that fluorides act as mineralizers and generally improve the melting characteristics when added to conventional glass compositions, and that phosphorus pentoxide may be substituted for soda to improve the melting characteristics, they were both generally believed to cause an increase in the liquidus temperature of the glass. Contrary to this belief, we have found that under certain conditions and within certain ranges of composition the results are quite different from previously held opinion and practice. Broadly, we utilize narrow ranges of fluorine or phosphorus pentoxide to shift the eutectic combination towards lower levels of silica and thus obtain all of the beforementioned desirable properties.

Figure 2:
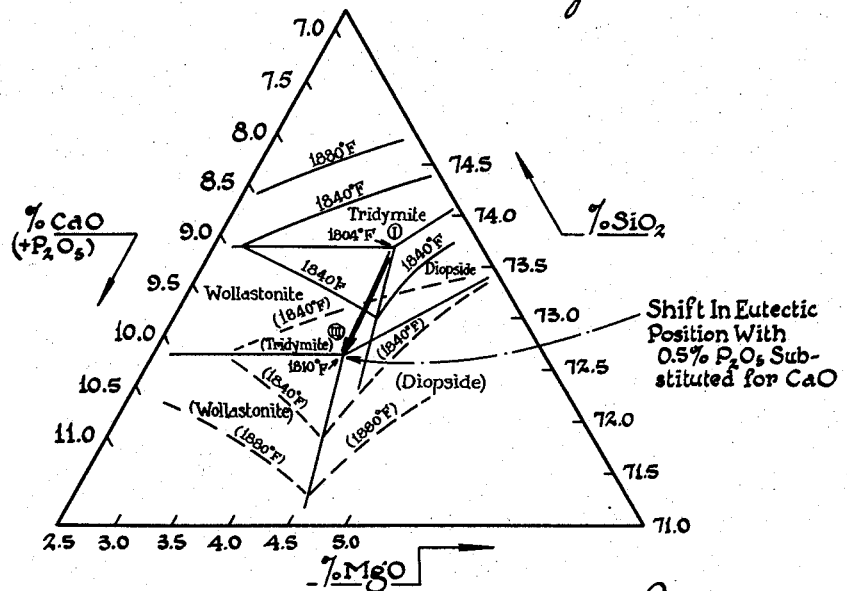

In the accompanying drawings:

Fig. 1 is a triaxial diagram showing the shift of phase boundaries of various glass compositions when fluorine is added to the batch; and Fig. 2 is a diagram of the type shown in Fig. 1 showing the phase shift when phosphorus pentoxide is used.

To best illustrate what happens to the crystallization temperature when fluorine is introduced in a series of soda-lime-magnesia-silica type glasses reference is made particularly to Fig. 1 which illustrates by relative position the combination of three variables which total a constant sum at all times. In this example, the variables are the CaO, MgO, and $SiO_2$ contents of the glass, the crystallization temperatures for which we have indicated by means of isotherms in Fig. 1. In particular, this figure represents the superposition of two diagrams, one illustrating a series of glasses without fluorine, and the other a series of glasses with 0.5% fluorine and fixed minor ingredients as shown in glass II of Table I below. For simplicity in presentation, only the 1800° F., 1840° F., and 1880° F. isotherms are shown, but other isotherms could be located by interpolation or extrapolation since these isotherms follow the same general pattern. The isotherms are represented, in Figs. 1 and 2, by dotted and solid lines, the dotted lines in Fig. 1 representing the isotherms of the composition containing F and, and in Fig. 2, of the composition containing $P_2O_5$. The solid lines in Figs. 1 and 2 represent the isotherms of the original starting glass compositions.

In the diagram of Fig. 1 it will be noted that 0.5% fluorine causes a marked shift in the location of the eutetic composition in this series, particularly in regard to the silica and CaO contents of the eutectic. Thus, it will be noted that the composition of the glass with the lowest crystallization temperature is shifted from that given in the diagram and further described below in Table I as Glass I, to the composition indicated both below and on the diagram as Glass II, when 0.5% fluorine is added to the Glass I composition, the isotherms for the shifted position being shown in dotted lines.

TABLE I

|  | Glass I | Glass II |
|---|---|---|
| $SiO_2$ percent | 73.7 | 72.0 |
| CaO do | 7.5 | 8.9 |
| MgO do | 4.1 | 4.1 |
| $Al_2O_3$ do | 1.3 | 1.3 |
| $Na_2O$ do | 13.2 | 13.2 |
| $SO_3$ do | 0.2 | 0.2 |
| F do | 0.0 | 0.5 |
| $-O_2$ equiv do | 0.0 | −0.2 |
| Liquidus Temp., °F | 1,804 | 1,792 |

As will be apparent from the above table, the presence of 0.5% fluorine in Glass II lowers the silica content necessary for the eutectic by 1.7%. This is a marked and unexpected shift which permits us to obtain glass compositions with excellent crystallization properties without using an excessively high silica content. Furthermore, it will be noted that the MgO content of the eutectic remained constant while the silica and calcium oxide contents of the eutectic composition are substantially changed.

In addition to the lowering of the silica content, it will be apparent that an extra benefit was also realized in the case of the fluoride additions in that the liquidus temperature of the eutectic was lowered 12° F.

It has been found that an almost linear change in the location of the phase boundaries towards a lower silica content has taken place as a result of the incorporation of fluorine. Consequently, it is possible to select the amount of fluorine required for optimum crystallization resistance solely on the basis of the silica content of the glass. In this respect, we have discovered that the crystallization characteristics of any glass of this general type can be improved by selecting the silica and fluorine contents to satisfy the following relationship:

Percent $SiO_2 = 73.7 \pm 0.2 - 3.4$ (percent F)

where the narrow range of fluorine has been found to be between 0.15% and 1.1% fluorine and the silica range to be from 69.8% to 73.4%.

As a further advantage we have found that the crystallization of such glasses containing silica and fluorine as determined by the above relation can be additionally improved by adjusting the magnesium oxide content to fall in the range 3.8% to 4.2%.

Glass compositions which are located in the tridymite field and which have fluorine or silica contents outside of the limits set forth above will remain in their original tridymite field with the incorporation of fluorine, while at the same time, their liquidus temperatures are increased markedly. For example, the glass composition A indicated below has its liquidus temperature raised over 100° F. to that indicated in composition B as fluorine is substituted for the CaO without change in the $SiO_2$ content.

TABLE II

|  | A | B |
|---|---|---|
| $SiO_2$ | 74.0 | 74.0 |
| CaO | 7.8 | 7.5 |
| MgO | 3.5 | 3.5 |
| $Na_2O$ | 13.2 | 13.2 |
| $Al_2O_3$ | 1.3 | 1.3 |
| $SO_3$ | 0.2 | 0.2 |
| F | 0.0 | 0.5 |
| $O_2$ equiv | 0.0 | −0.2 |
| Liquidus, Temperature, °F | 1,835 | 1,940 |
| Primary Phase | Trid. | Trid. |

On the other hand, the addition of fluorine to glasses which were originally in the wollastonite and diopside fields will first have the effect of decreasing the liquidus temperature, after which, further additions will change the primary phase to tridymite and the liquidus temperature will then increase. Thus, it will be noted that the proper amount of fluorine to be added to the glass to obtain the beforementioned crystallization benefits is quite critical.

As there are a number of ways of determining the percentage of fluorine in glass compositions, it is to be noted that the amount of fluorine in the above composition refers to the amount in the final glass as determined by chemical analysis. And, in order that the percentages of fluorine given herein as determined by analysis may have a definite specific meaning in view of the fact that analytical methods for determining the presence of combined fluorine in glass are not well developed, the method of analysis for fluorine in glass by which these results were obtained and which will hence serve to interpret the results is hereby given. This method is as follows:

(1) Fuse one gram of minus 60-mesh glass in a platinum crucible with 1.5 grams of $Na_2CO_3$. Commence the fusion on a Meeker burner. Transfer to a blast burner and fuse at low-temperature for 10 minutes. Swirl the melt in the crucible and allow to cool with the platinum lid on the crucible.

(2) Transfer to a 250 ml. beaker half-filled with water. Allow to soak for 2 hours. Stir and break up the particles often during the 2-hour period. Bring to boil with stirring and then crush the particles with a flattened glass rod.

(3) Allow to settle and then decant the supernatant liquid through a large No. 40 Whatman filter paper well packed with pulp. Catch the filtrate in a 250 ml. volumetric flask. Wash the residue with hot water until the flask is nearly full. Cool and bring the flask to volume.

(4) A 50 ml. aliquot is taken for the fluorine determination. This solution is placed in a 100 ml. tall-form beaker. Ten drops of Alizarin Red S indicator are added. 1–1 HCl is added dropwise until the solution turns yellow. 2% NaOH is added until a pink color shows. 1–50 HCl is added until the solution just turns yellow. One milliliter of buffer is added. The solution is mechanically stirred while standard thorium nitrate is added dropwise. The endpoint is reached when the first permanent pink color shows.

(5) To calculate the percent of fluorine in the glass, multiply the ml. of thorium reagent used by its fluorine equivalent by 500. To find the oxygen equivalent of fluorine multiply the percentage of fluorine by 16/38 or .421. This is to be subtracted from the total in reporting the complete analysis.

Preparation of reagents

*Standard NaF solution.*—Prepare standard solution from a C.P. NaF salt. Strength of solution is 5.7500 grams per liter or 0.0026 gm. $F_2$ per ml.

*Thorium nitrate.*—13.8 grams are made up to a liter with water. Standardize against standard NaF solution using procedure for fluorine in a glass, eliminating the preliminary fusion.

*Buffer solution.*—9.5 grams monochloracetic acid and 2 grams NaOH dissolved and diluted to 100 ml. with water.

*Sodium alizarin sulphonate.*—(Alizarin Red S) Dissolve 0.1 gm. in 200 ml. of $H_2O$ and filter.

Reference is now made to another embodiment of our invention, namely the addition of phosphorus pentoxide instead of fluorine to a glass composition. As beforementioned, phosphorus pentoxide may also be used to produce the results of our invention, and to best illustrate the changes that take place in the crystallization temperature when this oxide is introduced into a series of soda-lime-magnesia-silica type glasses, reference is made to Fig. 2. As is clearly shown in the diagram, the addition of 0.5% phosphorus pentoxide also causes a marked shift in the location of the eutectic composition, particularly in regard to the silica and CaO contents of the eutectic. It will be noted that the composition with the lowest crystallization temperature is shifted from the composition indicated below and on the diagram as Glass I to that indicated as Glass III both below and on the diagram when 0.5% phosphorus pentoxide is added to the series. This shift is quite similar to that achieved by the fluorine although the amount of reduction in the eutectic silica content is somewhat less for the addition of 0.5% $P_2O_5$ than for the addition of 0.5% fluorine.

TABLE III

|  | Glass I | Glass III |
|---|---|---|
| $SiO_2$ | 73.7 | 72.7 |
| CaO | 7.5 | 7.9 |
| MgO | 4.1 | 4.2 |
| $Al_2O_3$ | 1.3 | 1.3 |
| $Na_2O$ | 13.2 | 13.2 |
| $SO_3$ | 0.2 | 0.2 |
| $P_2O_5$ | 0.0 | 0.5 |
| Liquidus Temperature, ° F | 1,804 | 1,810 |

In considering the above Table III it will be noted that the MgO content of the eutectic remained substantially the same for both eutectic compositions illustrated, while the silica and calcium oxide contents of the eutectic composition were substantially changed. And, as before in the case of the fluorine, the transposition of the respective phase boundaries is found to be almost linear with the incorporation of phosphorus pentoxide so that it is possible to select the amount of phosphorus pentoxide for optimum crystallization resistance solely on the basis of the silica content of the glass. Likewise, it has been found that the crystallization characteristics of any soda-lime glass can be improved by selecting the silica and phosphorus pentoxide to satisfy the following relationship: Percent $SiO_2=73.7\pm0.2-2.0$ (percent $P_2O_5$) where the phosphorus pentoxide content ranges from 0.25% to 1.95% and the silica range is from 69.8% to 73.4%.

As before, a still further advantage has been found in that the crystallization of such glasses containing silica and phosphorus pentoxide as determined by the above relation can be additionally improved by adjusting the magnesium oxide content to fall in the range 3.8% to 4.2% as in the case of fluorine.

Now as a third embodiment of our invention we have found that the effects of fluorine and phosphorus pentoxide are additive and that they combine readily to give the beforementioned desirable properties. The exact relationship between the respective elements has been found to be the combination of the newly established constants of 3.4 (percent F) and 2.0 (percent $P_2O_5$) as used in the independent equations employing fluorine and phosphorus pentoxide respectively, the combination equation being: Percent $SiO_2=73.7\pm0.2-3.4$ (percent F)$-2.0$ (percent $P_2O_5$) for the limits of $SiO_2$ between 69.8% and 73.4%. In this equation, for the maximum percentage of $SiO_2$ (73.4%) where F is present with only trace amounts of $P_2O_5$ the amount of F used is approximately 0.15%. Where only trace amounts of F are used the $P_2O_5$ percent is approximately 0.25.

Compositions where the maximum percent $SiO_2$ is present along the mixtures of F and $P_2O_5$ will vary as to the mixtures of F and $P_2O_5$ from 0.15% F and 0% $P_2O_5$ to 0% F and 0.25% $P_2O_5$ and, the effects of the F and $P_2O_5$ being additive, the percent F and percent $P_2O_5$ will be determined for any intermediate mixture between the above-recited limits by the combined equation. Thus, where 0.075% F is used at a $SiO_2$ level of 73.4%, the percent of $P_2O_5$ present in admixture with the F is:

$$73.4=73.7\pm0.2-3.4(.075)-2.0 \text{ (percent } P_2O_5)$$

$$73.4=73.7+0.2-.25-2.0 \text{ (percent } P_2O_5)$$

$$\text{Percent } P_2O_5=\frac{.5-.25}{2} \text{ or } .125$$

As stated hereinbefore, the effect of the F and $P_2O_5$ is additive. Actually, in lowering the $SiO_2$ level according to the invention in the range of 69.8 to 73.4%, $3.4\times \text{percent } F=2.0\% \ P_2O_5$. Thus, the percent $SiO_2$ level may be adjusted when F is used in admixture with $P_2O_5$ by substituting for part of the F in the limits of 0.15 to 1.1%, an equivalent percent of $P_2O_5$. By way of example, where the $SiO_2$ level is at a maximum of 73.4% and only 0.075% F is used, an amount of $P_2O_5$ equivalent to the additional 0.075% F necessary to lower the $SiO_2$ to 73.4% must be added along with the F, and as $$2.0 \times \text{percent } P_2O_5 = 3.4 \times \text{percent } F$$

the equivalent amount of $P_2O_5$ which must be added equals $$\frac{3.4 \times .075}{2} \text{ or } 0.125$$

By way of further example, selecting a value of 70% $SiO_2$, we know that, in accordance with the following equation 1.09% F must be present when F is used alone.

Percent $SiO_2=73.7(\pm0.2)-3.4$ (percent F)
$70.0=73.7(\pm0.2)-3.4$ (percent F)
Percent $F=3.7/3.4$ or 1.09

Where only .30% F is used, then an amount of $P_2O_5$ equivalent to .79% F must be used in combination with the F and this may be determined by either of the following methods:

$$\text{Percent } P_2O_5=\frac{3.4 \text{ (percent F substituted for)}}{2}$$

$$\text{Percent } P_2O_5=\frac{3.4 \times .79}{2} \text{ or } 1.34$$

or
Percent $SiO_2=73.7(\pm0.2)-3.4$(percent F)$-2.0$(percent $P_2O_5$)
$70.0=73.7(\pm0.2)-3.4(0.30)-2.0$ (percent $P_2O_5$)
Percent $P_2O_5=1.34$ It would be readily as easy to determine the amount of $P_2O_5$ necessary to establish a given $SiO_2$ percentage and then substitute an equivalent amount of F as desired for any part of the $P_2O_5$.

Additionally, the effect of varying the percentages of the other glass ingredients (CaO, $Al_2O_3$, $Na_2O$, $Fe_2O_3$) on the above relations has been studied and it has been found that the relationship is relatively unaffected by the other ingredients as long as they are at customary levels, that is between 6% to 12% CaO, 0% to 2% $Al_2O_3$, 12% to 15% $Na_2O$ and 0% to 0.6% $Fe_2O_3$. It is also obvious that the sum total of all of the ingredients must be 100% and consequently the content of $Al_2O_3$, CaO, and $Na_2O$ plus any ingredients in minor quantities such as $SO_3$, $B_2O_3$, $K_2O$, $Fe_2O_3$, BaO or other oxides of the second group of the Mendeleff table must represent the difference. By minor amounts we mean less than 1% of such minor ingredients.

As pointed out previously, the effects of fluorine and phosphorus pentoxide are additive and combinable in that either may be used alone or in combination with the other. However, we have found that there are certain low limits for the fluorine and phosphorus pentoxide contents wherein the gain in desirable properties is too slight to be of commercial importance. These limits as mentioned hereinabove are approximately 0.15% fluorine and 0.25% phosphorus pentoxide.

Similarly, it has been found that certain high limits of these non-metals or their compounds cannot be exceeded without causing the glass to become opalescent or even substantially opaque to visible light radiation. We have also found that the amount of fluorine or phosphorus pentoxide vaporized and lost is relatively greater for large additions of the materials. Considering these factors, we have found the upper limit by weight of fluorine to be 1.1% fluorine, and the upper limit of phosphorus pentoxide to be 1.95%.

Likewise, there are also limits of silica below and above which it is not desirable to go because of increased costs, loss of durability, or increased melting scum, all of which are detrimental in one way or another to a mass-produced glass composition. In this respect, to obtain the optimum overall results, we have found that the best properties of the glass are obtained and utilized when the silica content of the glass is in the amount as prescribed by our formulas with the addition of fluorine and phosphorus pentoxide.

By way of illustration, several other typical compositions utilizing silica quantities as determined by our formulas are given in tabular form in Table IV.

TABLE IV

A. Glass compositions

| Material | Glass IV | Glass V | Glass VI |
|---|---|---|---|
| $SiO_2$ | 72.5 | 71.7 | 70.4 |
| $Al_2O_3$ | 1.0 | 0.7 | 1.5 |
| CaO | 8.5 | 9.2 | 9.3 |
| MgO | 4.1 | 3.9 | 4.0 |
| $Na_2O$ | 13.3 | 13.2 | 12.9 |
| $K_2O$ | 0.1 | 0.1 | 0.2 |
| $SO_3$ | 0.3 | 0.2 | 0.3 |
| F | 0.35 | | 0.25 |
| $O_2$ equiv. | −0.15 | | −0.1 |
| $P_2O_5$ | | 1.0 | 1.25 |
| Liquidus Temp., °F | 1,796 | 1,816 | 1,813 |

B. Batch compositions corresponding to the above

| | Glass IV | Glass V | Glass VI |
|---|---|---|---|
| Sand | 1,000 | 1,000 | 1,000 |
| Aplite | 58 | 42 | 94 |
| Calcium Limestone | 40 | 63 | 32 |
| Dolomitic Limestone | 269 | 256 | 275 |
| Soda Ash | 308 | 308 | 311 |
| Salt Cake | 12 | 12 | 12 |
| Fluorspar | 20 | | 15 |
| Bone Ash | | 31 | 41 |

In further considering glasses made according to our invention and the formulas contained herein, we have found that the glasses may be colored by the usual coloring ingredients or be made ultra-violet absorbing through the use of ceria, titania, or infra-red absorbing by the use of ferrous oxide without affecting the relationships set forth in the formulas.

And, although several embodiments have been described, it is to be understood that the forms of the invention disclosed herein are to be taken as the preferred embodiments thereof, and that various changes may be resorted to without departing from the spirit of the invention or the scope of the following claims.

We claim:

1. A glass composition consisting essentially of the following ingredients within the ranges given:

| | |
|---|---|
| Percent $SiO_2$ | 69.8 to 73.4 |
| Percent MgO | 3.8 to 4.2 |
| Percent CaO | 6 to 12 |
| Percent $Na_2O$ | 12 to 15 |
| Percent $Al_2O_3$ | 0 to 2 |
| Percent $Fe_2O_3$ | 0 to .6 |
| Percent minor ingredients | 0 to 1 |
| Percent F | 0.15 to 1.1 | with the above composition having the $SiO_2$ and F in a fixed relative relation substantially as determined by the following equation:

$$\text{Percent } SiO_2 = 73.7 \pm 0.2 - 3.4 (\text{percent } F)$$

2. A glass composition in accordance with claim 1 in which $P_2O_5$ is substituted for part of the F, the amount of $P_2O_5$ being determined by the following equation:

$$\text{Percent } P_2O_5 = \frac{3.4 \times (\text{percent F substituted for})}{2}$$

and said composition having the $SiO_2$, F and $P_2O_5$ in a fixed relative relation as determined by the following equation:

$$\text{Percent } SiO_2 = 73.7 \pm 0.2 - 3.4 (\text{Percent F}) - 2.0 (\text{Percent } P_2O_5)$$

3. A glass composition consisting essentially of the following ingredients within the ranges given:

| | |
|---|---|
| Percent $SiO_2$ | 69.8 to 73.4 |
| Percent MgO | 3.8 to 4.2 |
| Percent CaO | 6 to 12 |
| Percent $Na_2O$ | 12 to 15 |
| Percent $Al_2O_3$ | 0 to 2 |
| Percent $Fe_2O_3$ | 0 to .6 |
| Percent minor ingredients | 0 to 1 |
| Percent $P_2O_5$ | 0.25 to 1.95 | with the above composition having the $SiO_2$ and $P_2O_5$ in a fixed relative relation substantially as determined by the following equation:

$$\text{Percent } SiO_2 = 73.7 \pm 0.2 - 2.0 (\text{percent } P_2O_5)$$

4. A glass composition consisting essentially of the following ingredients in the proportions substantially as given:

| | |
|---|---|
| Percent $SiO_2$ | 72.0 |
| Percent CaO | 8.9 |
| Percent MgO | 4.1 |
| Percent $Al_2O_3$ | 1.3 |
| Percent $Na_2O$ | 13.2 |
| Percent $SO_3$ | 0.2 |
| Percent F | 0.5 |
| Percent −$O_2$ equiv. | −0.2 | and having a liquidus temperature of about 1792° F.

5. A glass composition consisting essentially of the following ingredients in the proportions substantially as given:

| | |
|---|---|
| Percent $SiO_2$ | 72.7 |
| Percent CaO | 7.9 |
| Percent MgO | 4.2 |
| Percent $Al_2O_3$ | 1.3 |
| Percent $Na_2O$ | 13.2 |
| Percent $SO_3$ | 0.2 |
| Percent $P_2O_5$ | 0.5 | and having a liquidus temperature of about 1810° F.

6. A glass composition consisting essentially of the following ingredients in the proportions substantially as given:

| | |
|---|---|
| Percent $SiO_2$ | 72.5 |
| Percent $Al_2O_3$ | 1.0 |
| Percent CaO | 8.5 |
| Percent MgO | 4.1 |
| Percent $Na_2O$ | 13.3 |
| Percent $K_2O$ | 0.1 |
| Percent $SO_3$ | 0.3 |
| Percent F | 0.35 |
| Percent −$O_2$ equiv. | −0.15 | and having a liquidus temperature of about 1796° F.

7. A glass composition consisting essentially of the following ingredients in the proportions substantially as given:

| | |
|---|---|
| Percent $SiO_2$ | 71.7 |
| Percent $Al_2O_3$ | 0.7 |
| Percent CaO | 9.2 |
| Percent MgO | 3.9 |
| Percent $Na_2O$ | 13.2 |
| Percent $K_2O$ | 0.1 |
| Percent $SO_3$ | 0.2 |
| Percent $P_2O_5$ | 1.0 | and having a liquidus temperature of about 1816° F.

8. A glass composition consisting essentially of the following ingredients in the proportions substantially as given:

| | |
|---|---|
| Percent $SiO_2$ | 70.4 |
| Percent $Al_2O_3$ | 1.5 |
| Percent CaO | 9.3 |
| Percent MgO | 4.0 |
| Percent $Na_2O$ | 12.9 |
| Percent $K_2O$ | 0.2 |
| Percent $SO_3$ | 0.3 |
| Percent F | 0.25 |
| Percent—$O_2$ equiv. | −0.1 |
| Percent $P_2O_5$ | 1.25 | and having a liquidus temperature of about 1813° F.

References Cited in the file of this patent

UNITED STATES PATENTS

| | | |
|---|---|---|
| 2,262,951 | Lyle | Nov. 18, 1941 |
| 2,508,070 | Lyle | May 16, 1950 |
| 2,552,495 | Poole | May 8, 1951 |